(12) United States Patent
Karlen

(10) Patent No.: US 10,427,229 B2
(45) Date of Patent: Oct. 1, 2019

(54) TOOL

(75) Inventor: Urs Karlen, Stalden (CH)

(73) Assignee: Robert Bosch GmbH, Stuttgart (DE)

( * ) Notice: Subject to any disclaimer, the term of this patent is extended or adjusted under 35 U.S.C. 154(b) by 345 days.

(21) Appl. No.: 14/130,371

(22) PCT Filed: Jun. 19, 2012

(86) PCT No.: PCT/EP2012/061647
§ 371 (c)(1),
(2), (4) Date: Mar. 21, 2014

(87) PCT Pub. No.: WO2013/004481
PCT Pub. Date: Jan. 10, 2013

(65) Prior Publication Data
US 2014/0190328 A1 Jul. 10, 2014

(30) Foreign Application Priority Data
Jul. 1, 2011 (DE) .......... 10 2011 078 488

(51) Int. Cl.
*B23D 61/00* (2006.01)
*B23D 65/00* (2006.01)

(52) U.S. Cl.
CPC .......... *B23D 61/006* (2013.01); *B23D 65/00* (2013.01); *Y10T 83/9362* (2015.04)

(58) Field of Classification Search
CPC .... B23D 61/006; B23D 65/00; Y10T 83/9362
See application file for complete search history.

(56) References Cited

U.S. PATENT DOCUMENTS

| | | | | |
|---|---|---|---|---|
| 4,513,742 A * | 4/1985 | Arnegger | ............ | B23D 61/006 30/350 |
| 4,617,930 A * | 10/1986 | Saunders | ............ | A61B 17/142 30/166.3 |
| 6,022,353 A * | 2/2000 | Fletcher | ................ | B23D 51/10 606/79 |
| 7,712,222 B2 * | 5/2010 | Korb | ..................... | B21D 53/64 30/346.53 |
| 2002/0017166 A1 | 2/2002 | Honickl | | |
| 2004/0098000 A1 * | 5/2004 | Kleinwaechter | ....... | A61B 17/14 D24/146 |
| 2005/0245935 A1 | 11/2005 | Casey et al. | | |

(Continued)

FOREIGN PATENT DOCUMENTS

CN 1846915 A 10/2006
CN 2865962 Y 2/2007
(Continued)

OTHER PUBLICATIONS

International Search Report corresponding to PCT Application No. PCT/EP2012/061647, dated Oct. 12, 2012 (German and English language document) (7 pages).

*Primary Examiner* — Stephen Choi
(74) *Attorney, Agent, or Firm* — Maginot, Moore & Beck LLP

(57) ABSTRACT

A tool, in particular a plunge-cut saw blade, includes a saw blade that has at least one main body and at least one working part. The working part has at least one working edge with saw teeth and is connected integrally to the main body along a straight connecting edge. The working edge includes a curved and/or polygon-like formation thereon.

19 Claims, 4 Drawing Sheets

(56) References Cited

U.S. PATENT DOCUMENTS

2006/0191396 A1* 8/2006 Dion .................. B23D 61/12
83/835
2011/0256814 A1* 10/2011 Steiger ................ B23D 61/006
451/163
2011/0316241 A1* 12/2011 Zhang ................. B23D 61/006
279/143

FOREIGN PATENT DOCUMENTS

| | | |
|---|---|---|
| CN | 101678484 A | 3/2010 |
| DE | 40 36 904 C1 | 5/1992 |
| DE | 198 04 762 A1 | 7/1999 |
| DE | 20 2004 007 929 U1 | 8/2004 |
| DE | 103 25 392 A1 | 12/2004 |
| DE | 10 2004 050 798 A1 | 4/2006 |
| DE | 10 2007 058 889 A1 | 12/2008 |
| DE | 10 2008 041 425 A1 | 2/2010 |
| DE | 20 2010 013 008 U1 | 3/2011 |
| EP | 0 881 023 A2 | 5/1998 |
| EP | 1 190 800 A2 | 8/2001 |
| EP | 1 170 082 A1 | 1/2002 |
| EP | 1 297 932 A1 | 4/2003 |
| EP | 1481750 A1 * | 12/2004 |
| EP | 2 011 444 A2 | 1/2009 |
| WO | WO-2010020458 A1 * | 2/2010 |

* cited by examiner

TOOL

This application is a 35 U.S.C. § 371 National Stage Application of PCT/EP2012/061647, filed on Jun. 19, 2012, which claims the benefit of priority to Serial No. DE 10 2011 078 488.8, filed on Jul. 1, 2011 in Germany, the disclosures of which are incorporated herein by reference in their entirety.

BACKGROUND

There are already known tools, in particular plunge-cut saw blades, that have a saw blade comprising at least one main body and at least one working part, which working part has at least one working edge having a set of saw teeth and is connected integrally to the main body along a straight connecting edge. In the case of these tools, the working edge having the set of saw teeth is straight.

SUMMARY

The disclosure is based on a tool, in particular a plunge-cut saw blade, that has a saw blade comprising at least one main body and at least one working part, which working part has at least one working edge having a set of saw teeth and is connected integrally to the main body along a straight connecting edge.

A curved and/or polygon-like form of the working edge is proposed. A "plunge-cut saw blade" in this context is to be understood to mean, in particular, a tool having a saw blade provided to be driven, preferably in an oscillatory manner about a rotation axis, by a hand-held power tool. The tool preferably comprises a fastening part by which it can be fastened to a hand-held power tool. The plunge-cut saw blade can be suitable, in particular, for producing a slot-type opening by plunge-cutting into a workpiece. A "saw blade" in this context is to be understood to mean, in particular, a thin plate that is provided with a set of saw teeth on at least one edge and that is provided for performing work on a workpiece, with removal of material, by means of the set of saw teeth. A "main body" of the saw blade in this context is to be understood to mean, in particular, a part of the saw blade that is preferably made of a tough, fracture-resistant material. Preferably, the main body is made of a steel. Preferably, the main body constitutes the largest part of the saw blade. A "working part" of the saw blade in this context is to be understood to mean, in particular, a part of the saw blade that comprises the working edge provided with the set of saw teeth. Preferably, the working part is made of a hard, wear-resistant material, particularly preferably a high-speed steel (HSS). Also conceivable, however, are other materials, commonly known to persons skilled in the art, that are suitable for the main body and/or the working part. In particular, the working part is made of a harder and/or more wear-resistant material than the main body. The material of the working part in this case can also include a hard metal, or be composed of a hard metal. The hard metal in this case preferably includes at least one carbide—e.g. tantalum carbide, titanium carbide and/or tungsten carbide—and/or a nitride—e.g. boron nitride and/or titanium nitride. A "working edge" in this context is to be understood to mean, in particular, a connecting line constituted by the tips of the set of saw teeth of the working part. A "connecting edge" in this context is to be understood to mean, in particular, an edge along which the main body is connected integrally, in particular in a materially bonded manner, to the working part. The working part can be connected to the main body along the connecting edge, in particular, by electron-beam or laser welding. Also conceivable, however, are other methods for materially bonded connection that are commonly known to persons skilled in the art. A "curved" working edge in this context is to be understood to mean, in particular, that the working edge constituted by the connecting line of the tooth tips has a curvature. Preferably, the curved working edge is constituted by the shortest, continuously curved connecting line between the tooth tips. The curvature can differ in degree along the working edge. For example, the connecting line can be at least parabola-like. Preferably, the working edge is symmetrical in form with respect to a mid-perpendicular of the working edge. Particularly preferably, the working edge constitutes a circle segment, at least substantially. "Substantially" in this context is to be understood to mean, in particular, that more than 50%, preferably more than 80% of the length of the working edge constitutes a circle segment. Particularly preferably, the center of the circle segment is located substantially on the rotation axis of an oscillating sawing motion, for which the saw blade is provided. "Substantially" in this context is to be understood to mean, in particular, that the position of the center of the circle segment and the position of the rotation axis deviate by less than 20%, preferably by less than 10%, and especially by less than 5% relative to the shortest distance of the rotation axis relative to the center of the working edge. A "polygon-like" form of the working edge in this context is to be understood to mean, in particular, that the working edge includes a plurality of segments whose connecting lines of the tooth tips form straight lines, at least substantially. Preferably, at least three tooth tips form a straight-line segment in each case. "Substantially" in this context is to be understood to mean, in particular, that the deviation from a straight line is less than 10%, preferably less than 5%, particularly preferably less than 1% of the length of the respective segment. Preferably, the tooth spacings of teeth of the set of saw teeth of adjacent segments correspond to the tooth spacings of the teeth within a segment of the set of saw teeth, such that there are no gaps between the segments. Particularly preferably, the connecting points of the segments are located on a circle segment, at least substantially. Particularly preferably, the center of the circle segment is located substantially on the rotation axis of the sawing motion for which the saw blade is provided. The curved and/or polygon-like working edge prevents the outer edges of the set of saw teeth from becoming caught during plunge-cutting into the workpiece. A particularly precise sawing result can be achieved. Vibration can be minimized. The saw blade can have a particularly long service life. Work can be performed on particularly hard workpieces such as, for example, metals.

Preferably, a bimetallic strip comprises the main body and the working part. A "bimetallic strip" in this context is to be understood to mean, in particular, a strip of material composed, at least, of two differing metals and/or metal alloys. In particular, the strip of material can be composed of a tough basic material and, at least partially, of a harder, wear-resistant material particularly suited to constituting a set of saw teeth. The tough part of the bimetallic strip can constitute the main body, and the wear-resistant, harder part can constitute the working part of the saw blade. The basic material can preferably be constituted by a steel, while the harder part can preferably be constituted by a high-speed steel. The material of the harder part in this case can also include a hard metal or be composed of a hard metal. The hard metal in this case preferably includes at least one carbide—e.g. tantalum carbide, titanium carbide and/or tungsten carbide—and/or a nitride—e.g. boron nitride and/or titanium nitride. The two parts are preferably connected in a materially bonded manner, in particular by electron-beam or laser welding, along a straight connecting edge. An efficient saw blade having a particularly long service life can be achieved.

It is proposed that the saw blade be made of a bimetallic strip having two edges that are at least substantially parallel. Preferably, the saw blade is made of a bimetallic strip that is at least substantially rectangular. Particularly preferably, the connecting edge of the two metals and/or metal alloys of the bimetallic strip is parallel to at least two parallel edges of the bimetallic strip. In particular, the saw blade can be made of a bimetallic strip that is produced by parting-off from a bimetallic band. Preferably, the connecting edge and the two parallel edges are located in the longitudinal direction of the bimetallic band. "Substantially parallel" in this context is to be understood to mean, in particular, that a deviation from a parallelism of the two edges is less than 10°, preferably less than 5°, particularly preferably less than 1°. "Substantially rectangular" in this context is to be understood to mean, in particular, that the edges of the material strip enclose between them angles of between 85° and 95°, preferably between 88° and 92°, particularly preferably between 89° and 91°. The saw blade can be produced particularly inexpensively from a bimetallic strip.

The working edge having the set of saw teeth can be produced by a stamping method, a laser cutting method or other method known to persons skilled in the art. Advantageously, the working edge and/or the set of saw teeth is/are produced by a milling process. Particularly advantageously, the working edge and/or the set of saw teeth is/are produced by a grinding process. A working edge and/or a set of saw teeth of particularly high quality can be produced in a grinding process. Also possible are combinations of differing production methods considered appropriate by persons skilled in the art.

It is furthermore proposed that a height of the working part be greater than a height of the set of saw teeth. A "height of the working part" in this context is to be understood to mean, in particular, the measure, perpendicular to the connecting edge, from the center of the working edge as far as the start of the main body. A "height of the set of saw teeth" in this context is to be understood to mean, in particular, a height, measured perpendicularly to the connecting edge, between the tooth tip at the greatest distance from the connecting edge and the tooth tip at the least distance from the connecting edge. Advantageously, this enables at least all tooth tips to be made of a hard and/or wear-resistant material. Particularly advantageously, a "height of the set of saw teeth" in this context is to be understood to mean the maximum extent of the set of saw teeth from the tooth base to the tooth tips of all teeth in the saw blade, measured perpendicularly to the connecting edge. Advantageously, this enables the set of saw teeth to be made entirely of a hard and/or wear-resistant material. The wear resistance of the saw blade can be improved.

It is furthermore proposed that the saw blade be connected to the fastening part in an overlapping manner. A particularly stable connection can be achieved between the working part and the saw blade. Differing connection methods, commonly known to persons skilled in the art, are conceivable. The saw blade can be adhesive-bonded or riveted to the fastening part. Preferably, the saw blade is fastened to the fastening part by means of a spot-welded connection. A particularly robust, inexpensive connection can be achieved. It is possible to dispense with further means for connection, such as rivets and/or welding materials and adhesives.

Also proposed is a method for producing a tool. It is proposed that, in a first production step, a bimetallic strip be parted off from a bimetallic band. Preferably, the bimetallic strip is parted off, at least substantially, transversely in relation to the connecting edge of the two metals and/or metal alloys of the bimetallic strip. The bimetallic strip preferably comprises at least one part made of a tough metal, and at least one part made of a harder, more wear-resistant metal, which parts are connected in a materially bonded manner via a connecting edge. The tough part preferably constitutes the main body of the saw blade, and the harder, wear-resistant part constitutes the working part of the saw blade. In a further production step, the curved and/or polygon-like working edge and the set of saw teeth is/are formed on a straight edge of the working part that is preferably aligned parallel to the connecting edge. The working edge having the set of saw teeth can be formed by a milling method, preferably by means of a grinding method. Stamping methods and other methods commonly known to persons skilled in the art are also conceivable. Preferably, the working edge and the set of saw teeth are produced in one working step. In a further working step, the saw blade having a straight edge is connected to the fastening part in an overlapping manner, in particular by a spot-welded connection. The saw blade can be produced in a particularly inexpensive and precise manner. In particular, distortion of the saw blade can be prevented, and the saw blade can be made to lie flatly on the fastening part in a particularly precise manner.

BRIEF DESCRIPTION OF THE DRAWINGS

Further advantages are given by the following description of the drawings. The drawings show exemplary embodiments of the disclosure. The drawings, the description and the claims contain numerous features in combination. Persons skilled in the art will also expediently consider the features individually and combine them to create appropriate further combinations.

In the drawings.

DETAILED DESCRIPTION

Figure 1:
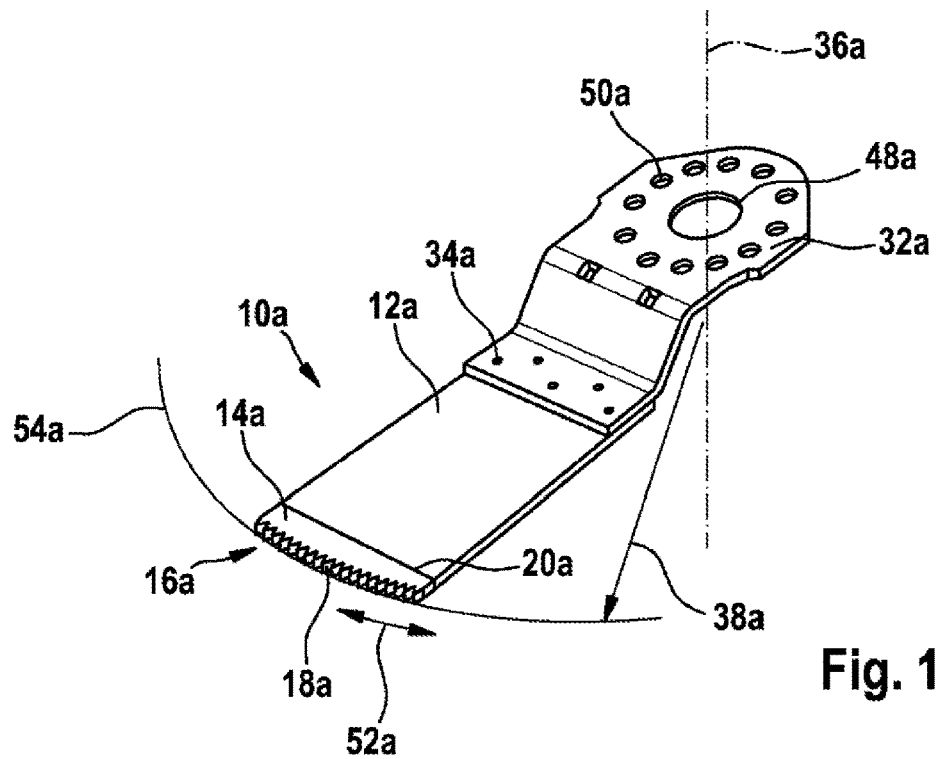
FIG. 1 shows a schematic representation of a tool according to the disclosure, having a saw blade.
Figure 2:
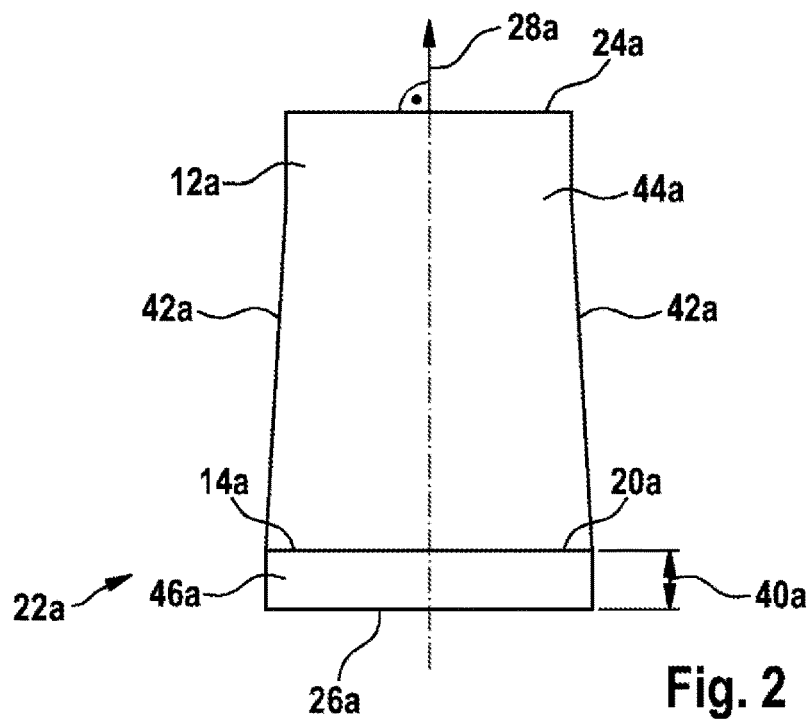
FIG. 2 shows a schematic representation of a bimetallic strip for producing a saw blade.
Figure 3:
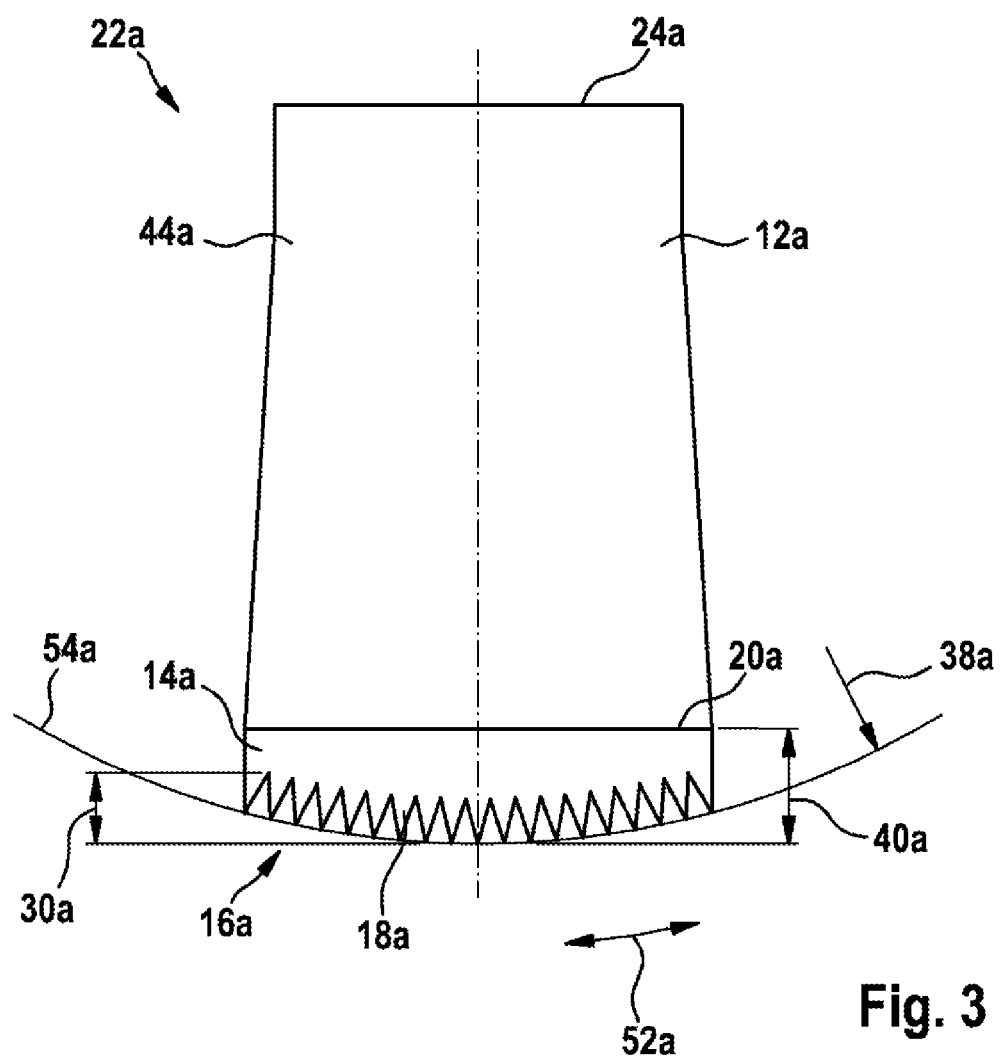
FIG. 3 shows a schematic representation of the saw blade following the attachment of the working edge according to the disclosure, having a set of saw teeth.

FIG. 1 shows a tool, realized as a plunge-cut saw blade, that has a saw blade 10*a* comprising a main body 12*a* and a working part 14*a*, which working part has a working edge 16*a* having a set of saw teeth 18*a* and is connected integrally to the main body 12*a* along a straight connecting edge 20*a*. The working edge 16*a*, constituted by a continuously curved line along tooth tips of the set of saw teeth 18*a*, has a curved form. The saw blade 10*a* is composed of a bimetallic strip 22*a*, which comprises the main body 12*a* and the working part 14a (FIG. 2). The bimetallic strip 22a has a wider steel strip 44a and a narrower high-speed steel strip 46a. Alternatively or additionally, the narrower high-speed steel strip 46a can also be made of a material that includes at least one hard metal or that is composed of at least one hard metal. The hard metal in this case preferably includes, as a reinforcement phase, at least one carbide—e.g. tantalum carbide, titanium carbide and/or tungsten carbide—and/or a nitride—e.g. boron nitride and/or titanium nitride. In particular, a strip composed of a broader steel strip 44a and a narrower strip 46a that includes a hard metal is also to be understood to be a bimetallic strip 22a within the meaning of the disclosure. The two strips 44a, 46a are connected along the connecting edge 20a, via a welded connection, for example a laser-welded connection or electron-beam welded connection (see 104 and 106 in FIG. 5). The bimetallic strip 22a has two parallel edges 24a, 26a. The connecting edge 20a is likewise parallel to the edges 24a, 26a. The working edge 16a and the set of saw teeth 18a (FIG. 3) are applied to the bimetallic strip 22a in a grinding process (see 108 and 110 in FIG. 5). A height 40a of the working part 14a, measured perpendicularly to the center of the working edge, or connecting edge 20a, is greater than a height 30a of the set of saw teeth 18a. The height 30a of the set of saw teeth 18a extends over the maximum extent of all saw teeth. It is also possible for the height 40a of the working part 14a to be selected such that at least all tooth tips of the set of saw teeth 18a are located in the working part 14a.

A fastening part 32a, to which the main body 12a of the saw blade 10a is connected in an overlapping manner by means of a spot-welded connection 34a (see 116, 118, 120 in FIG. 5), serves to fasten the tool to a hand-held power tool, not represented in greater detail. The tool is provided to be driven in an oscillatory manner about a rotation axis 36a by the hand-held power tool. A centering means 48a, which is realized as an opening in the fastening part 32a, serves to center the tool on a drive axis of the hand-held power tool. Form closure means 50a serve to transmit torque from the hand-held power tool and to define a rotary position. The curvature of the working edge 16a corresponds to a circle segment having a radius 38a about the rotation axis 36a. The edge 24a of the main body 12a faces toward the rotation axis 36a. When a slot is sawed into the workpiece by plunging the saw into the workpiece, the working edge 16a provided with the set of saw teeth 18a does not become caught. The set of saw teeth 18a moves with a sawing motion 52a along a circular path 54a having the radius 38a about the rotation axis 36a. The curved working edge 16a provided with the set of saw teeth 18a executes a uniform cut.

Figure 5:
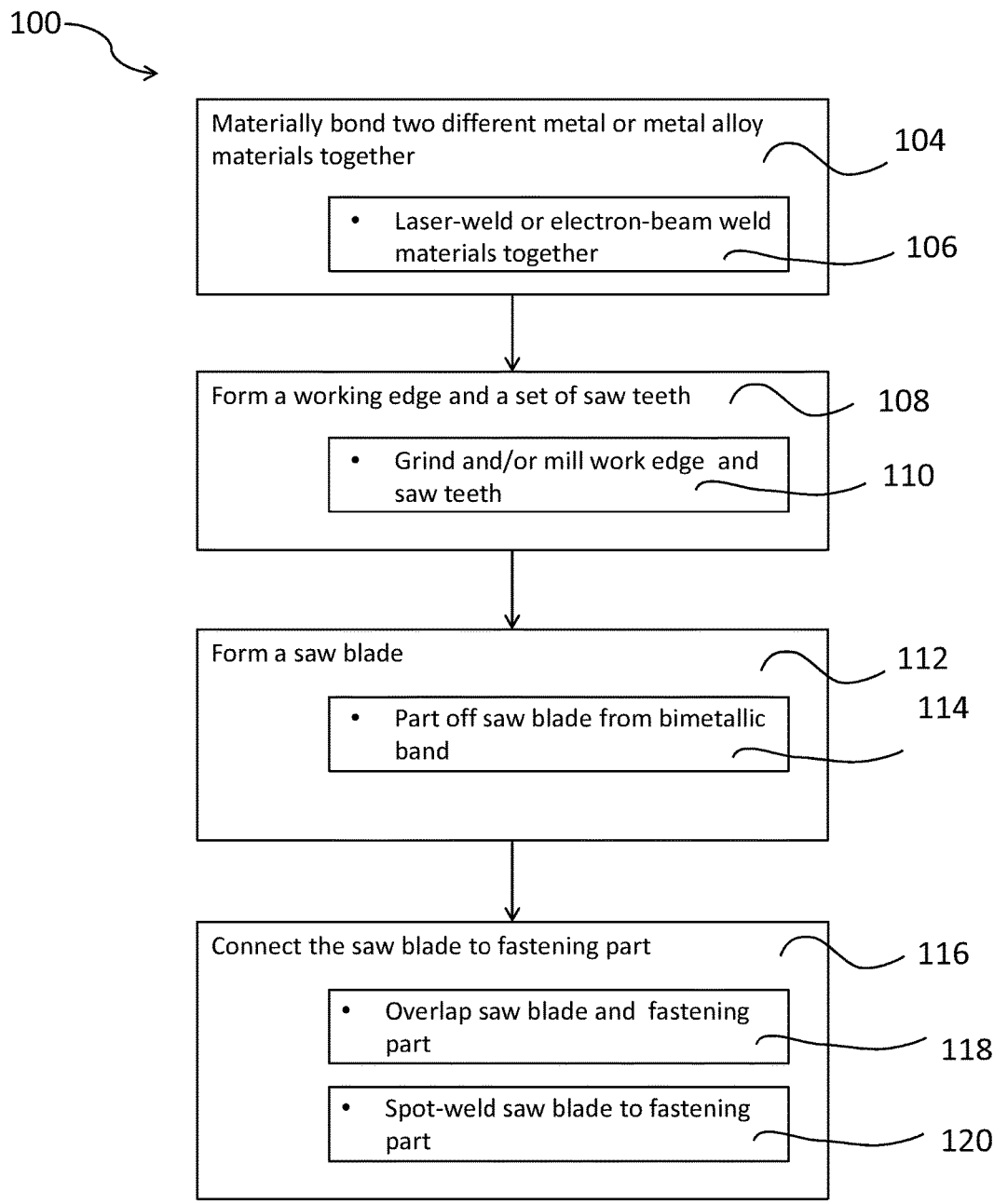
FIG. 5 shows a diagram of one embodiment of a method for producing a tool according to the disclosure.

For the purpose of producing the tool, as shown in method 100 in FIG. 5, the working edge 16a and the set of saw teeth 18a are produced in one working step (see 108, 110 in FIG. 5). The bimetallic strip 22a is then parted off from a bimetallic band, not represented, by means of a parting tool (see 112, 114 in FIG. 5), and the side edges 42a are produced at the parting edges of the bimetallic strip 22a. The side edges 42a are inclined in the direction of the rotation axis 36a, such that the saw blade 10a tapers in the direction of the rotation axis 36a. The bimetallic strip 22a includes a broader steel strip 44a and a narrower high-speed steel strip 46a, which are connected in a materially bonded manner along the connecting edge 20a. An outer edge of the steel strip 44a constitutes the edge 24a of the main body 12a of the saw blade 10a, and an outer edge of the high-speed steel strip 46a constitutes the edge 26a of the working part 14a of the saw blade 10a. The curved working edge 16a provided with the set of saw teeth 18a is produced, in a grinding process, at the edge 26a of the working part 14a. The main body 12a is connected to the fastening part 32a in an overlapping manner by means of a spot-welding operation (see 116, 118, 120 in FIG. 5). A center normal 28a of the edge 24a is aligned in the direction of the rotation axis 36a of the fastening part 32a.

The following description and the drawing of a further exemplary embodiment are limited substantially to the differences between the exemplary embodiments and, in principle, reference may be made to the drawing and the description of the other exemplary embodiment in respect of components having the same designation, in particular in respect of components having the same reference numerals. In order to differentiate the exemplary embodiments, instead of the letter a of the first exemplary embodiment, the letter b has been appended to the reference numerals of the further exemplary embodiment.

Figure 4:
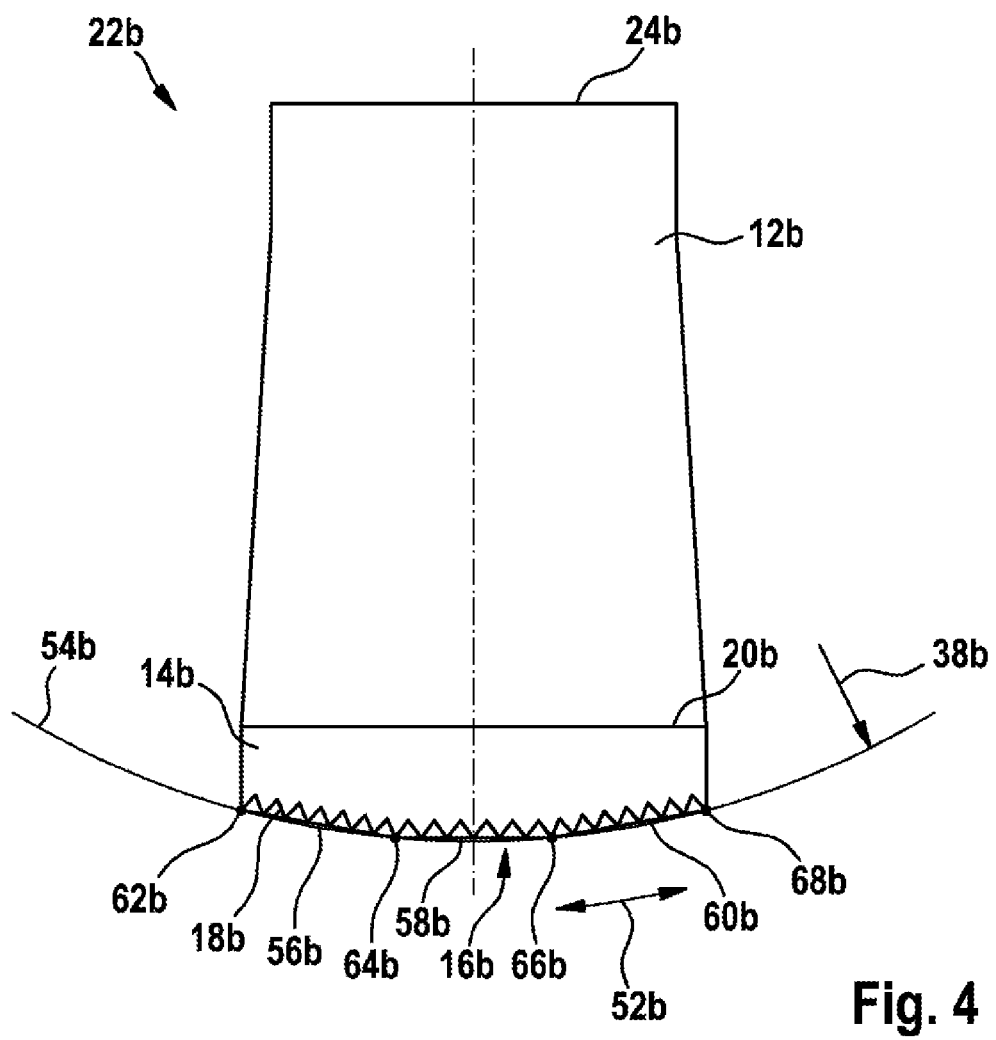
FIG. 4 shows a schematic representation of a saw blade following the attachment of the working edge according to the disclosure, having a set of saw teeth, in a second embodiment.

FIG. 4 shows a saw blade 10b in a further exemplary embodiment. A working edge 16b of the saw blade 10b has a polygon-like form. The working edge 16b has three straight polygon segments 56b, 58b, 60b. The central polygon segment 58b is aligned parallel to a connecting edge 20b. The polygon segments 56b and 60b are inclined, relative to the polygon segment 58b, in the direction of a rotation axis 36b. End points 62b, 64b, 66b, 68b of the polygon segments 56b, 58b, 60b are located on a circular path 54b having a radius 38b about the rotation axis 36b. Also conceivable are realizations having a greater number of polygon segments.

The invention claimed is:
1. A tool configured to be fastened to a hand-held power tool, the tool comprising:
   a saw blade composed of a bimetallic strip, the saw blade including:
      at least one main body; and
      at least one working part connected integrally to the at least one main body along a straight connecting edge, the at least one working part having at least one working edge having a set of saw teeth; and
   a fastening part to which the saw blade is connected in an overlapping manner,
   wherein the bimetallic strip comprises two different metal or metal alloy materials that are materially bonded together along the straight connecting edge,
   wherein the bimetallic strip comprises the at least one main body and the at least one working part,
   wherein the at least one working edge is shaped as a plurality of polygon segments including a first polygon segment, which is arranged substantially parallel to the straight connecting edge, and a second polygon segment and a third polygon segment, each of which is angled relative to the first polygon segment,
   wherein each of the first, second, and third polygon segments includes two end points,
   wherein each of the first, second, and third polygon segments includes at least three tooth tips,
   wherein the end points of the first, second, and third polygon segments are located on a circular path having a radius about an axis of rotation of the tool, and
   wherein the fastening part includes a form closure mechanism configured to transmit torque from the hand-held power tool and to define a rotary position of the saw blade relative to the hand-held power tool.
2. The tool as claimed in claim 1, wherein the bimetallic strip has at least two edges that are at least substantially parallel to the straight connecting edge and that are each spaced apart from the straight connecting edge.

3. The tool as claimed in claim 1, wherein one or more of the at least one working edge and the set of saw teeth is produced in one or more of a grinding process and a milling process.

4. The tool as claimed in claim 1, wherein a height of the at least one working part is greater than a height of the set of saw teeth.

5. The tool as claimed in claim 1, wherein the saw blade is fastened to the fastening part by a spot-welded connection.

6. The tool as claimed in claim 1, wherein the tool is configured as a plunge-cut saw blade.

7. The tool as claimed in claim 1, wherein:
a first of the two end points of the first polygon segment is coincident with one of the end points of the second polygon segment, and
a second of the two end points of the first polygon segment is coincident with one of the end points of the third polygon segment.

8. The tool as claimed in claim 1, wherein the at least one working part consists of hard metal.

9. The tool as claimed in claim 1, wherein the two different metal or metal alloy materials are materially bonded together by laser-welding or electron-beam welding.

10. The tool as claimed in claim 1, wherein the at least three tooth tips of each of the first, second, and third polygon segments form a respective straight-line segment.

11. The tool as claimed in claim 1, wherein the saw teeth are arranged such that a respective imaginary straight connecting line touches the at least three tooth tips of each of the polygon segments.

12. A method for producing a tool, comprising:
forming a saw blade from a bimetallic material comprising two different metal or metal alloy materials that are materially bonded together along a straight connecting edge, the saw blade including at least one main body and at least one working part, the at least one working part being connected integrally to the at least one main body along the straight connecting edge; and
forming a set of saw teeth in at least one working edge of the at least one working part, the at least one working edge being shaped as a plurality of polygon segments including a first, second, and third polygon segment, each of the first, second, and third polygon segments including two end points, each of the first, second, and third polygon segments including at least three tooth tips, the end points of the first, second, and third polygon segments located on a circular path having a radius about an axis of rotation of the tool,
wherein forming the saw blade includes parting off the saw blade from a bimetallic band with a parting tool, the bimetallic band comprising the two different metal or metal alloy materials that are materially bonded together.

13. The method as claimed in claim 12, wherein the at least one working edge is produced when the set of saw teeth is produced.

14. The method of claim 12, further comprising materially bonding the two different metal or metal alloy materials together by laser-welding or electron-beam welding.

15. The method of claim 12, further comprising forming one or more of the at least one working edge and the set of saw teeth by one or more of grinding and milling.

16. The method of claim 12, further comprising connecting the saw blade to a fastening part in an overlapping manner.

17. The method of claim 16, wherein connecting the saw blade to the fastening part includes spot-welding.

18. The method of claim 12, wherein the saw teeth are formed such that the at least three tooth tips of each of the first, second, and third polygon segments form a respective straight line segment.

19. The method of claim 12, wherein the saw teeth are formed such that a respective imaginary straight connecting line touches the at least three tooth tips of each of the polygon segments.

* * * * *